(12) United States Patent
Nakamizo

(10) Patent No.: US 8,931,533 B2
(45) Date of Patent: Jan. 13, 2015

(54) TIRE AND METHOD OF PRODUCING THE SAME

(75) Inventor: Akira Nakamizo, Higashiyamato (JP)

(73) Assignee: Bridgestone Corporation, Tokyo (JP)

( * ) Notice: Subject to any disclaimer, the term of this patent is extended or adjusted under 35 U.S.C. 154(b) by 990 days.

(21) Appl. No.: 13/055,186

(22) PCT Filed: Jul. 16, 2009

(86) PCT No.: PCT/JP2009/062897
§ 371 (c)(1),
(2), (4) Date: Jan. 21, 2011

(87) PCT Pub. No.: WO2010/010844
PCT Pub. Date: Jan. 28, 2010

(65) Prior Publication Data
US 2011/0126952 A1  Jun. 2, 2011

(30) Foreign Application Priority Data
Jul. 22, 2008  (JP) ................................. 2008-189056

(51) Int. Cl.
B60C 11/13  (2006.01)
B29C 35/02  (2006.01)
B60C 11/03  (2006.01)

(52) U.S. Cl.
CPC ......... B60C 11/0306 (2013.04); B60C 11/0309 (2013.04)
USPC ..................................... 152/209.21; 264/326

(58) Field of Classification Search
CPC  B60C 11/0306; B60C 11/0309; B60C 11/12; B60C 11/13; B60C 11/1204; B60C 11/1218; B60C 2011/1307; B60C 2011/1338; B60C 2011/1204; B60C 2011/1209; B60C 2011/1213; B60C 2011/1353; B60C 2011/1361; B60C 2011/133; B60C 11/1315; B60C 11/1323; B60C 11/1353; B60C 11/1369; B60C 11/042; B60C 11/045; B60C 11/047; B60C 11/11; B60C 19/002; B29C 30/00; B29C 35/00; B29C 35/02

USPC ............ 152/209.21, 209.18, 209.19, DIG. 1; 264/326, 328.2
See application file for complete search history.

(56) References Cited

U.S. PATENT DOCUMENTS 6,119,744 A * 9/2000 Tsukagoshi ............... 152/209.19
2007/0062626 A1 * 3/2007 Oyama ..................... 152/209.19

FOREIGN PATENT DOCUMENTS

DE  4403662  * 8/1995
EP  1946943  * 7/2008
(Continued)

OTHER PUBLICATIONS

International Search Report issued in PCT/JP2009/062897 dated Sep. 8, 2009.
(Continued)

Primary Examiner — Eric Hug
(74) Attorney, Agent, or Firm — Sughrue Mion, PLLC

(57) ABSTRACT

An object of the invention is to provide a tire and a method of producing the tire, in which tire breakage of a groove fence in vulcanization molding and generation of cracks at a groove bottom can be suppressed, noise is relatively low and uneven wear is less likely to occur. At least one of a groove wall 71 surface of the circumferential groove 222 and a side wall 43 surface of a stepped land portion 41 is provided with a groove fence 51 which are formed in the extending direction of the circumferential groove at a predetermined intervals therebetween such that the groove fence protrudes in the groove widthwise direction of the circumferential groove. The groove fence 51 is characterized in that: it has a thin wall portion 53 having a shape in which a portion 61 thereof on the side of the groove bottom of the circumferential groove has been notched in a section orthogonal to the circumferential groove 22; and an angle formed by a notched face 53a of the thin wall portion 53 with respect to the at least one of the wall surfaces 71 provided with the groove fence 51 is set at 70° or smaller.

8 Claims, 3 Drawing Sheets

(56) References Cited

FOREIGN PATENT DOCUMENTS

| | | | |
|---|---|---|---|
| JP | 3-276802 | * | 12/1991 |
| JP | 5-169920 | * | 7/1993 |
| JP | 8-150812 | * | 6/1996 |
| JP | 10-6716 | * | 1/1998 |
| JP | 10-006716 A | | 1/1998 |
| JP | 11-105511 A | | 4/1999 |
| JP | H11180113 A | | 7/1999 |
| JP | 2000-177323 A | | 6/2000 |
| JP | 2001030715 A | | 2/2001 |
| JP | 2003-211916 | * | 7/2003 |
| JP | 2005-263087 | * | 9/2005 |
| JP | 2006-35968 | * | 2/2006 |
| JP | 2006-035968 A | | 2/2006 |
| JP | 2006-137231 | * | 6/2006 |
| JP | 2008-174198 A | | 7/2008 |
| WO | 2009/084666 A1 | | 7/2009 |
| WO | WO 2009/084666 | * | 7/2009 |

OTHER PUBLICATIONS

Japanese Office Action issued in corresponding Japanese Patent Application No. 2008-189056, dated Dec. 4, 2012.
Chinese Office Action dated Dec. 3, 2012 issued in Chinese Patent Application No. 200980134754.3.
Extended European Search Report dated Sep. 19, 2014, issued in European Patent Application No. 09800358.5.

* cited by examiner

TIRE AND METHOD OF PRODUCING THE SAME

TECHNICAL FIELD

The present invention relates to a tire, in particular, to a tire capable of achieving a high degree of compatibility between improvement of uneven wear resistance of tread rubber and reduction of noise during running of the tire, as well as suppressing crack generation at a groove bottom. The present invention also relates to a method of producing such a tire as described above.

PRIOR ART

A tire generally has plural circumferential grooves continuously extending along the tire circumferential direction in a tread portion thereof. In a tire having circumferential grooves of this type in a tread portion, at least some degree of uneven wear which is called "river wear" or "railway wear" occurs along edges of the circumferential grooves and sometimes such uneven wear as described above grows to generate an uneven wear-derived broken portion called "rib punch" in a tread rubber land portion between and along the adjacent circumferential grooves. The uneven wear-derived broken portion not only significantly shortens the product life of the tread rubber in terms of wear but also significantly deteriorates driving stability and riding comfort of a vehicle. In this regard, it is well known that a tire having a linear circumferential groove tends to be the most vulnerable to uneven wear.

Examples of effective means for improving uneven wear of this type include to provide, as shown in JP 2000-177323, a pair of grooves, narrow sipes or the like continuously extending in the circumferential direction of a tread surface in tread rubber of a tread portion, to form in the tread portion, by the pair of grooves or narrow sipes, plural stepped land portions separated from the tread rubber land portions and having a step-down surfaces stepped down from the tread surface. In such a tire as described above, it is possible to cause a surface of a stepped land portion to have slip contact with a road surface within a ground-contact surface of a tread portion of the tire being rotated under a load exerted thereon and thus concentrate a shearing force in the tire circumferential direction opposite to the vehicle travelling direction, i.e. a breaking force, on the stepped land portion, to make the stepped land portion function as a uneven wear sacrifice portion, such that uneven wear like river wear can be prevented or suppressed.

On the other hand, due to increase in opportunity to run at a relatively high speed as a result of remarkable developments of superhighway networks, a linear circumferential groove having a relatively large width has been basically employed as a groove demarcating land portions in a tread in view of resistance to wet skid to be concerned. Such a linear circumferential groove causes a problem in that pipe resonance occurs inside the groove, which is a new factor of deteriorating noise problems. Pipe resonance is a phenomenon in which, when a groove width of a circumferential groove of a tire makes rapid movements at a leading edge and a trailing edge thereof due to action from an external force during rotation of a tire in contact with the ground, high-frequency vibration is generated at a groove wall (or a land portion wall) and the high-frequency vibration vibrates air inside the circumferential groove at a ground contact surface, i.e. "a pipe", whereby noise deteriorates due to an acoustic resonance effect based thereon.

Examples of effective means for preventing noise from deteriorating due to pipe resonance described above include provision of groove fences inside the circumferential groove such that the groove fences extend from a groove wall or groove bottom in a direction to block air flow, as shown in JP 11-105511. In a tire for use in a truck or a bus, in particular, since such a tire has a relatively large groove volume, pipe resonance which causes a noise problem during running of a tire can be remarkably decreased by providing a soft groove fence or blocking structure in the circumferential direction at a predetermined interval therebetween such that a portion of tread rubber extends from a groove wall or a groove bottom in a direction to block air flow to form the groove fence or blocking structure.

In the case of the tire as disclosed in JP 2000-177323, it is known that noise is rather generated by pipe resonance occurring between the stepped land portion and respective groove walls, facing the stepped land portion, of the circumferential groove than pipe resonance occurring inside the circumferential groove as a whole. In view of this, as in the technique disclosed in JP 11-105511, it is necessary in the structure of JP 2000-177323 to provide at least one of respective groove walls facing the stepped land portion, of a circumferential groove, with groove fences in terms of suppressing noise due to pipe resonance. However, in a tire as disclosed in JP 2000-177323, there is a problem that the groove width of a portion of the circumferential groove, facing the stepped land portion, is relatively small and the groove bottom of the circumferential groove cannot be connected with a connecting portion of each groove fence with a smooth radius of curvature, whereby stress is likely to concentrate on the connecting portion and cracks may be generated at the groove bottom.

DISCLOSURE OF THE INVENTION

An object of the invention is to provide a tire and a method of producing the tire, in which tire breakage of a groove fence in vulcanization molding and generation of cracks at a groove bottom can be suppressed, noise is relatively low and uneven wear is less likely to occur, by providing a stepped land portion and a groove fence having an optimized shape within a circumferential groove.

The inventors of the present invention, as a result of a keen study to solve the problems described above, have discovered that: a tire in which noise is relatively low and uneven wear is less likely to occur can be realized by providing at least one of a groove wall surface of the circumferential groove and a side wall surface of the stepped land portion, with a groove fence protruding in the groove widthwise direction of the circumferential groove, in the extending direction of the circumferential groove at a predetermined intervals therebetween; cracks which tend to be generated at the groove bottom can be effectively prevented by designing the shape of the groove fence to have a thin wall portion where a groove bottom side portion thereof has been notched in a section orthogonal to the circumferential groove and setting an angle formed by a notched face of the thin wall portion with respect to the at least one of the wall surfaces provided with the groove fence at 70° or smaller and thus suppressing concentration of stress at a joint portion of the thin wall portion of the groove fence with the groove bottom of the circumferential groove; and breakage of the groove fence in vulcanizaition molding can be suppressed by limiting the angle formed by the notched face of the thin wall portion with respect to the wall surface.

The present invention is based on the discoveries as described above and the summary thereof is as follows.

(1) A tire, in which a circumferential groove extending in the tire circumferential direction is provided in a tread portion, the tread portion is demarcated into plural land portions by the circumferential groove, and a groove bottom portion within the circumferential groove, distanced from respective groove walls of the circumferential groove, is provided with a stepped land portion as an uneven wear sacrifice portion having a surface positioned on the inner side in the tire radial direction than tread surfaces of the land portions and designed to have slip contact with a road surface when the tire is rotated under a load exerted thereon, comprises:

a groove fence provided on at least one of a groove wall surface of the circumferential groove and a side wall surface of the stepped land portion, in the extending direction of the circumferential groove at a predetermined intervals therebetween, such that the groove fence protrudes in the groove widthwise direction of the circumferential groove, wherein the groove fence has a thin wall portion having a shape in which a portion thereof on the side of the groove bottom of the circumferential groove has been notched in a section orthogonal to the circumferential groove, and an angle formed by a notched face of the thin wall portion with respect to the at least one of the wall surfaces provided with the groove fence is set at 70° or smaller.

(2) The tire of the aforementioned aspect (1) is characterized in that the groove fence is designed such that the innermost position in the tire radial direction of the thin wall portion thereof provided on at least one of the wall surfaces is located on the outer side in the tire radial direction than the groove bottom portion of the circumferential groove.

(3) The tire of the aforementioned aspect (1) or (2) is characterized in that the thin wall portion of the groove fence is connected with the groove bottom portion of the circumferential groove with radius of curvature having continuity between the thina wall portion and the groove bottom.

(4) The tire of any of the aforementioned aspects (1) to (3) is characterized in that the maximum protruding width of the groove fence is in the range of 20 to 80% of the width between the stepped land portion and the groove wall of the circumferential groove in a state where the groove fence is not provided.

(5) The tire of any of the aforementioned aspects (1) to (4) is characterized in that the groove fences are provided such that at least one groove fence exists within a ground contact region of the tire under a condition in which the prescribed maximum air pressure and the prescribed maximum load capacity are applied to the tire.

(6) The tire of any of the aforementioned aspects (1) to (5) is characterized in that the groove fence is provided only at the groove wall, located on the outer side in the tire widthwise direction, of the circumferential groove.

(7) The tire of any of the aforementioned aspects (1) to (6) is characterized in that the circumferential groove is a zigzag groove extending in a zigzag manner along the tire circumferential direction.

(8) A method of producing a tire, in which tire a circumferential groove extending in the tire circumferential direction is provided in a tread portion, the tread portion is demarcated into plural land portions by the circumferential groove, and a groove bottom portion within the circumferential groove, distanced from respective groove walls of the circumferential groove, is provided with a stepped land portion as an uneven wear sacrifice portion having a surface positioned on the inner side in the tire radial direction than tread surfaces of the land portions and designed to have slip contact with a road surface when the tire is rotated under a load exerted thereon, comprises:

conducting vulcanization molding such that: a groove fence is provided on at least one of a groove wall surface of the circumferential groove and a side wall surface of the stepped land portion, in the extending direction of the circumferential groove at a predetermined intervals therebetween, such that the groove fence protrudes in the groove widthwise direction of the circumferential groove, wherein the groove fence has a thin wall portion having a shape in which a portion thereof on the side of the groove bottom of the circumferential groove has been notched in a section orthogonal to the circumferential groove, and an angle formed by a notched face of the thin wall portion with respect to the at least one of the wall surfaces provided with the groove fence is set at 70° or smaller.

According to the present invention, there can be provided a tire and a production method thereof, in which tire breakage of a groove fence in vulcanization molding and generation of cracks at a groove bottom can be suppressed, noise is relatively low and uneven wear is less likely to occur.

BEST MODE FOR IMPLEMENTING THE INVENTION

A structure of the present invention and reasons for limitation will be described with reference to FIGS. 1 to 4 hereinafter.

Figure 1:
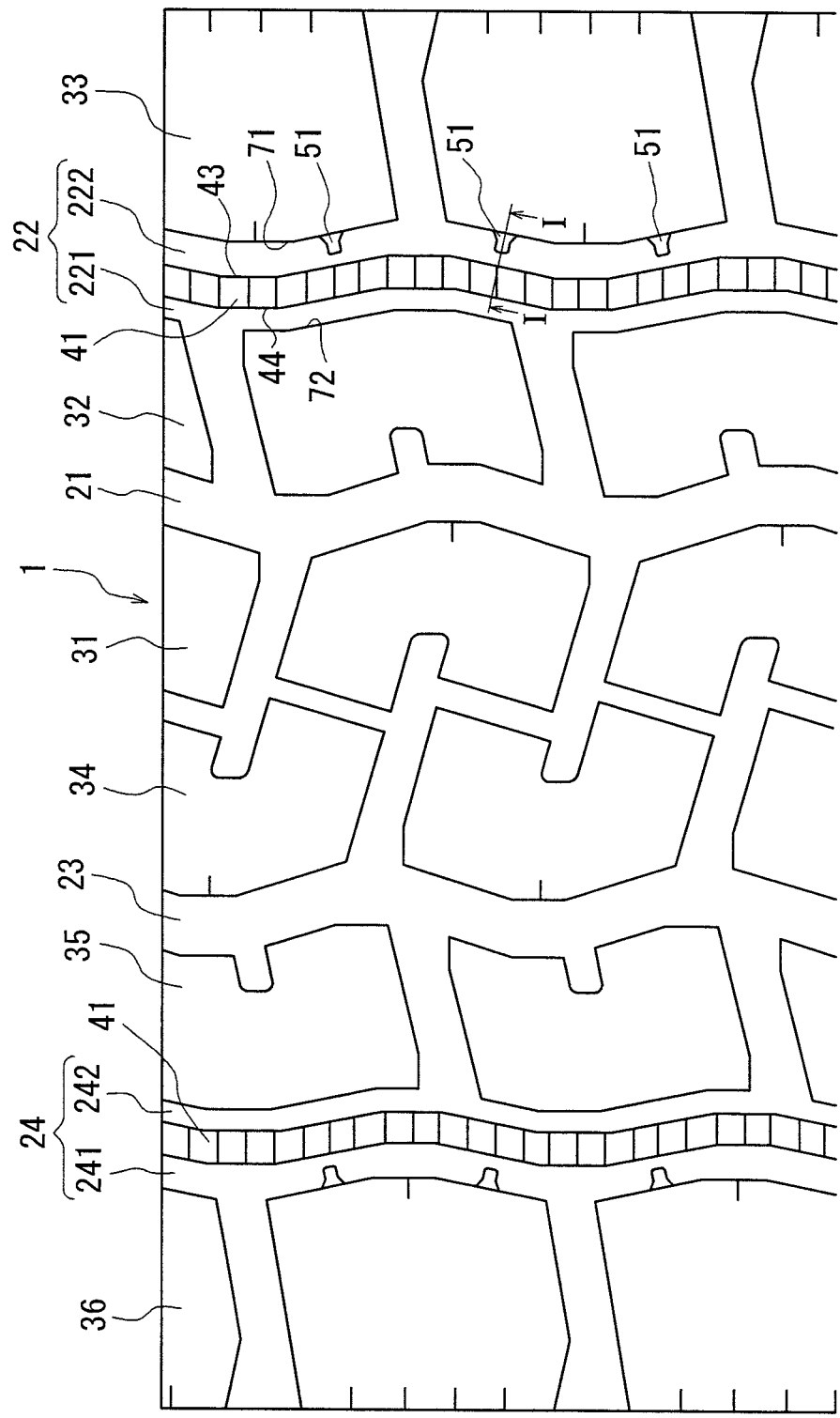
FIG. 1 is a tread pattern of a tire according to the present invention.
Figure 2:
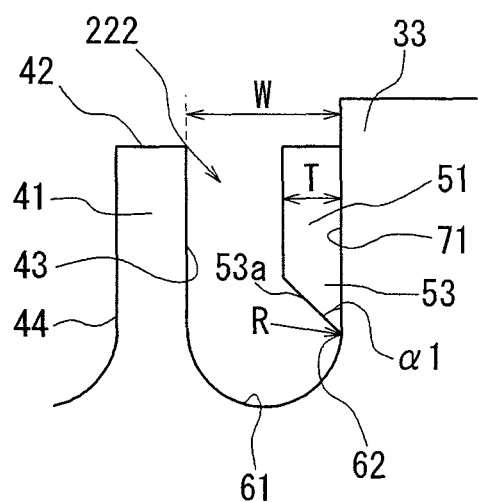
FIG. 2 is a sectional view cut along I-I in FIG. 1.

FIG. 1 is a view showing a tire of the present invention. FIG. 1 is a development view of a tread surface. FIG. 2 is a sectional view cut along the I-I line in FIG. 1. The present invention is a tire, in which at least one circumferential groove extending along the tire circumferential direction (four circumferential grooves 21 to 24 in FIG. 1) is provided in a tread portion 1, the tread portion 1 is demarcated into plural land portions 31 to 36 by the circumferential grooves 21 to 24, and a stepped land portion 41 having a surface 42 as an uneven wear sacrifice portion of the tire land portions is provided such that the surface is positioned on the inner side in the tire radial direction than tread surfaces of the land portions and has slip contact with a road surface when the tire is rotated with load exerted thereon.

Further, as shown in FIG. 1, at least one of a groove wall 71, 72 surface of the circumferential groove 22, 24 and a side wall 43, 44 surface of the stepped land portion 41 is provided with at least one groove fence 51 formed in the extending direction of the circumferential groove 22, 24 at a predetermined intervals therebetween such that the groove fence protrudes in the groove widthwise direction of the circumferential groove 22, 24. As shown in FIG. 2, the groove fence 51 has a thin wall portion 53 having a shape in which a portion thereof on the side of the groove bottom of the circumferential groove 22 has been notched in a section orthogonal to the circumferential groove 22, and an angle formed by a notched face 53a of the thin wall portion 53 with respect to the at least one of the wall surfaces 71 provided with the groove fence 51 is set at 70° or smaller.

Figure 3:
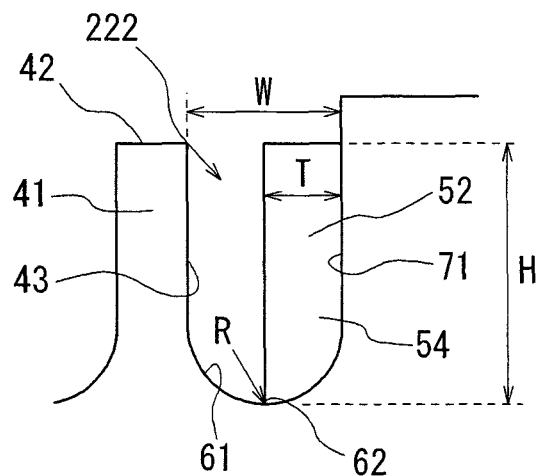
FIG. 3 is a sectional view in the tire widthwise direction of a circumferential groove facing a stepped land portion in a tire where the groove bottom of the circumferential groove is provided with a groove fence of a conventional shape.
Figure 4:
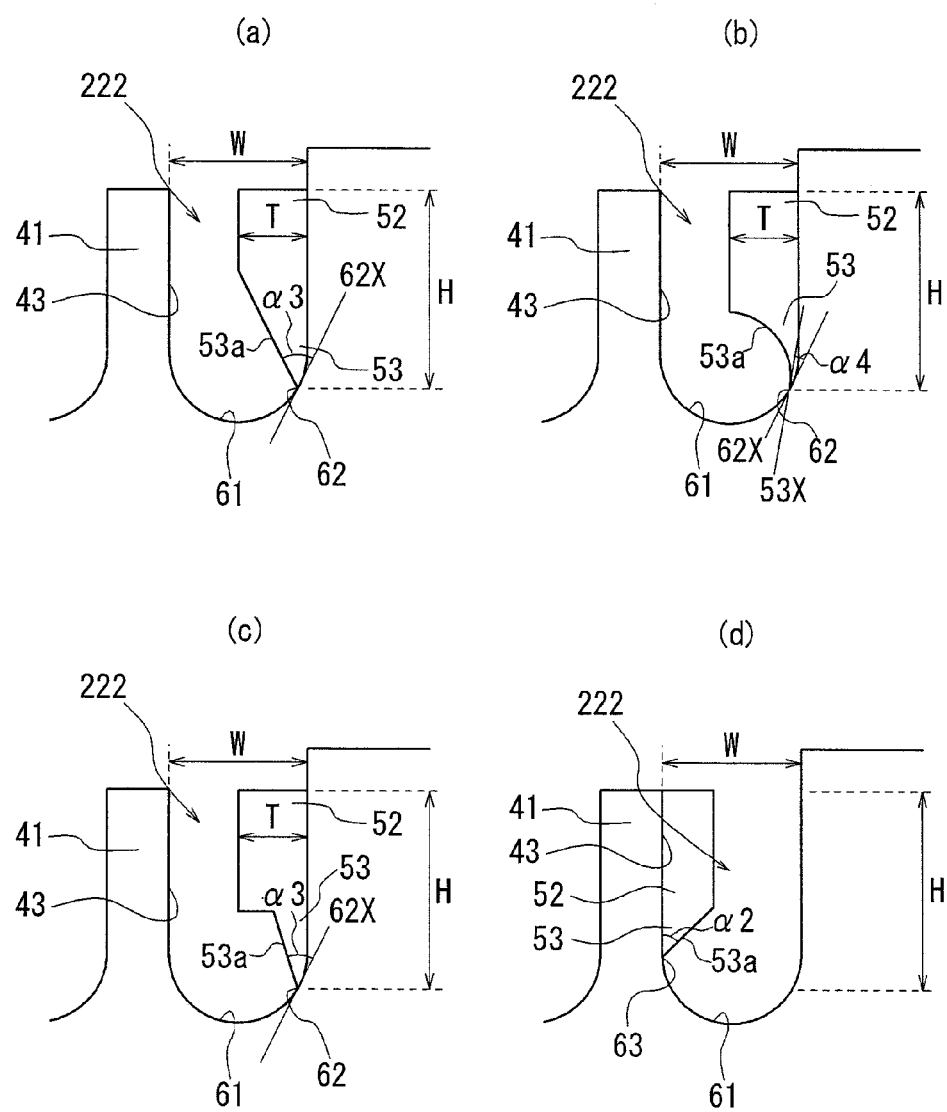
FIGS. 4(a) to 4(d) are each a sectional view in the tire widthwise direction of a circumferential groove provided with a groove fence having a thin wall portion of varied shape.

FIG. 3 is a sectional view cut along the circumferential groove 22, of a tire in which a groove wall, facing the stepped land portion, of the circumferential groove is provided with a groove fence 52 of the conventional shape. The inventors of the present invention have assiduously made keen studies regarding a problem that, since a circumferential groove portion 222 facing the stepped land portion 41 has a narrow groove width and the radius of curvature R of the groove bottom 61 is relatively small, provision of the groove fence 52 at the groove wall 71 would result in easy concentration of stress on a joint portion 62 of the innermost position 54 in the tire radial direction of the groove fence 52 and the groove bottom portion of the circumferential groove portion 222, which may cause cracks in the joint portion 62; therefore the groove fence 52 actually cannot be provided and thus pipe resonance occurring within the circumferential groove portion 222 facing the stepped land portion 41 cannot be suppressed. As a result, the inventors have discovered that, as shown in FIG. 2, by designing the shape of the groove fence 51 so as to include the thin wall portion 53 having a shape in which a portion thereof on the side of the groove bottom of the circumferential groove 222 in a section orthogonal to the circumferential groove 22 has been notched, concentration of stress on joint portion of the innermost position 62 in the tire radial direction of the thin wall portion 53 of the groove fence 51 and the groove bottom 61 of the circumferential groove portion 22 can be suppressed, whereby the groove fence 51 can be provided in the circumferential groove portion 222 facing the stepped land portion 41 without causing cracks to be generated at the groove bottom 61.

Provision of the thin wall portion 53 causes a superior effect in terms of suppressing generation of cracks at the groove bottom 61. However, in a case where the groove fence 51 having the thin wall portion 53 is produced by vulcanization molding, there is a concern that, when a mold for use in molding is released from a tire, the mold is engaged with the notched face 53a of the thin wall portion 53 and the groove fence is broken as a result of stress exerted thereon in the tire radial direction for releasing the mold from the tire. Therefore, the inventors keenly made further studies regarding optimization of the shape of the thin wall portion 53 and has discovered that, by setting an angle formed by the notched face 53a with respect to the at least one of the wall surfaces 71 provided with the groove fence 51 at 70° or smaller, preferably 60° or smaller, it is possible to offset the mold in the tire axial direction and/or deform the stepped land portion when the mold is lifted up, whereby stress exerted on the groove fence 51 is decreased and breakage of the groove fence 51 in vulcanization molding can be effectively suppressed.

In the present invention, the thin wall portion 53 represents a groove bottom side portion of the groove fence 51, which groove bottom side portion has a shape in which a portion thereof has been notched in the direction of the groove wall 71. There is no specific restriction on the shape of the notched face 53a of the thin wall portion 53. For example, as shown in FIGS. 4(a) to 4(c), the thin wall portions 53 of various shapes may be used. Further, the thin wall portion 53 of the groove fence is preferably connected with the groove bottom portion 61 of the circumferential groove 222 in which the thin wall portion is provided, with radius of curvature having continuity between the thin wall portion and the groove bottom portion. The smaller radius of curvature at the groove bottom portion 61 results in the larger stress exerted on the groove bottom, which may cause cracks therein. Stress exerted on the groove bottom can thus be effectively decreased by connecting the thin wall portion with the groove bottom 61 of the circumferential groove portion 222, within the circumferential groove portion 222, with a radius of curvature having continuity between the thin wall portion and the groove bottom 61.

In the present invention, an angle formed by the notched face 53a of the thin wall portion 53 with respect to the at least one of the wall surfaces 71 provided with the groove fence 51 literally represents the angle α formed by the notched face 53a with respect to the circumferential groove. Examples thereof include α1 formed by the notched face 53a of the thin wall portion 53 with respect to the groove wall 71 of the circumferential groove 22 as shown in FIGS. 2 and α2 formed by the notched face 53a of the thin wall portion 53 with respect to the side wall 43 of the stepped land portion 41 as shown in FIG. 4(d). Further, when viewed in a section orthogonal to the circumferential groove 22, in a case where the innermost position 62 in the tire radial direction of the thin wall portion 53 is positioned at the curved groove bottom portion 61 as shown in FIGS. 4(a) and 4(c), the angle α represents α3 formed by the notched face 53a of the thin wall portion 53 with respect to the tangent 61X of the groove bottom portion 61 at the innermost position 62 in the tire radial direction of the thin wall portion 53. Further, in a case where the notched face 53a is curved as shown in FIG. 4(b), the angle α represents α4 formed by the tangent 53X of the notched face 53a with respect to the tangent 61X of the groove bottom 61 at the innermost position 62 in the tire radial direction of the thin wall portion 53.

Further, in the groove fence 51, as shown in FIG. 2, the innermost position 62 in the tire radial direction of the thin wall portion 53 provided on at least one of the wall surfaces 71 (the groove wall 71 of the circumferential groove 22 in FIG. 2) is preferably located on the outer side in the tire radial direction than the groove bottom 61 portion of the circumferential groove 222. In the present invention, the groove bottom portion 61 represents a portion ranging from the deepest portion of the groove bottom toward the side wall 71 to the position where the radius of curvature reaches ∞. Breakage of the groove fence 51 occurs due to repeated concentration of stress at the groove bottom portion, which concentration of stress is caused by repetition of a ground contact state and a non-contact state of the tire with a road surface in running of the tire. Therefore, an effect of suppressing breakage of a groove fence can be effectively obtained by locating the innermost position 62 in the tire radial direction of the thin wall portion 53 so as to avoid the groove bottom portion 61. Further, if the groove fence 51 were to be provided at the groove bottom portion 61, controllably setting an angle α formed by the notched face 53a of the thin wall portion 53 with respect to the at least one of the wall surfaces 71 provided with the groove fence 51 at 70° or smaller would be difficult and breakage of the groove fence 51 in vulcanization molding might not be sufficiently controlled.

Yet further, the maximum protruding width T of the groove fence 51 preferably blocks 20 to 80% of the width W measured between the stepped land portion 41 and the groove wall 71 of the circumferential groove 22 in a state where the groove fence is not provided. In a case where the maximum protruding width T of the groove fence 51 blocks less than 20% of the aforementioned measured width W, sound passes through the clearance and thus an effect of decreasing pipe resonance is insufficient. In a case where the maximum protruding width T of the groove fence 51 exceeds 80% of the measured width W, when a diagonal force such as a side force is exerted on the tire, the groove fence 51 collides with the facing stepped land portion and causes, due to deformation thereof, cracks at the groove bottom 61. Yet further, the thickness in the tire circumferential direction of the groove fence 51 is preferably in the range of 0.5 to 3.0 mm. In a case where the thickness in the tire circumferential direction of the groove fence 51 is less than 0.5 mm, an effect of decreasing pipe resonance by blocking the groove is less likely to be obtained. In a case the thickness in the tire circumferential direction of the groove fence 51 exceeds 3.0 mm, drainage property in a tread surface deteriorates.

Yet further, the groove fence is preferably provided such that at least one groove fence exists within a ground contact region under a condition in which the prescribed maximum air pressure and the prescribed maximum load capacity are applied to the tire. Since the groove fence portion is provided such that at least one groove fence portion exists within a ground contact region in running of the tire, the tire can be constantly brought into a state in which the functions of the groove fence are being demonstrated during running of the tire, whereby pipe resonance can be continually suppressed. In the present invention, "the prescribed maximum air pressure" and "the prescribed maximum load capacity" are "the maximum air pressure" and "the maximum load capacity" prescribed in JATMA YEAR BOOK standardized by JATMA (Japan Automobile Tire Manufacturers Association).

The groove fence 51 is preferably provided, as shown in FIG. 1(a), only at a groove wall located on the outer side in the tire widthwise direction of the circumferential groove portions 222, 242. Since the groove width of the circumferential groove 222, 242 is narrow and the radius of curvature R of the groove bottom 61 is small, as compared with those of the grooves 21, 23 in the tire center portion, provision of the conventional groove fences in the circumferential groove portions 222, 242 would result in generation of cracks at the groove bottom.

Further, the circumferential grooves 21 to 24 are preferably zigzag grooves extending in a zigzag manner along the tire circumferential direction. Due to this structure, the extension length of the circumferential groove can be changed and thus the frequency of pipe resonance can be varied.

As shown in FIG. 2 and FIG. 4(d), the groove fence 51 is provided on at least one of the groove wall 71, 72 surface of the circumferential groove 22, 24 and the side wall 43, 44 surface of the stepped land portion 41. However, the groove fence of the present invention can be provided at a groove wall 71 of the circumferential groove 22, 24 in which the stepped land portion 41 is not provided. In this case, there can be obtained a tire in which breakage of groove fence in vulcanization molding can be suppressed, cracks are prevented from being generated at the groove bottom of the circumferential grooves 22, 24, and noise is relatively low.

Next, a method of producing the tire of the present invention will be described.

The method of producing a tire of the present invention is a method of producing a tire, in which tire a circumferential groove extending in the tire circumferential direction is provided in a tread portion, the tread portion is demarcated into plural land portions by the circumferential groove, and a groove bottom portion within the circumferential groove, distanced from respective groove walls of the circumferential groove, is provided with a stepped land portion as an uneven wear sacrifice portion having a surface positioned on the inner side in the tire radial direction than tread surfaces of the land portions and designed to have slip contact with a road surface when the tire is rotated under a load exerted thereon. Specific production processes thereof are not particularly restricted and the processes similar to those of the conventional tire production method may be employed.

Further, the method of producing a tire of the present invention includes a vulcanization molding step in which a groove fence is provided on at least one of a groove wall surface of the circumferential groove and a side wall surface of the stepped land portion, in the extending direction of the circumferential groove at a predetermined intervals therebetween, such that the groove fence protrudes in the groove widthwise direction of the circumferential groove, wherein the groove fence has a thin wall portion having a shape in which a portion thereof on the side of the groove bottom of the circumferential groove has been notched in a section orthogonal to the circumferential groove, and an angle formed by a notched face of the thin wall portion with respect to the at least one of the wall surfaces provided with the groove fence is set at 70° or smaller. The method of the present invention is effective in that, by optimizing the shape of the thin wall portion, a tire can be released from a mold after vulcanization molding without breaking the groove fence.

The foregoing descriptions show only one example of an embodiment of the present invention and various changes may be made within the scope of accompanying claims.

Examples of the present invention will be described hereinbelow.

EXAMPLE 1

In Example 1, there was used as a sample a 15° taper radial ply tire for a truck or a bus (tire size: 11822.2 16PR, rim size: 8.25), in which: a stepped land portion is provided in the circumferential groove; the groove wall positioned on the outer side in the tire widthwise direction of the circumferential groove portion (depth: 16.7 mm, width: 5 mm, radius of curvature: 2 mm) facing the stepped land portion is provided with groove fences which are formed along the tire circumferential direction at intervals of 250 mm therebetween such that each groove fence has a shape as shown in FIG. 2 and includes a thin wall portion having depth: 2 mm, the maximum protruding width T: 3 mm and the length H in the tire radial direction: 13 mm and that an angle formed by a notched face of the thin wall portion with respect to the at least one of the wall surfaces provided with the groove fence is set at 60'; and the tire is inflated at an air pressure of 800 kPa.

EXAMPLE 2

In Example 2, there was used as a sample a 15° taper radial ply tire for a truck or a bus (tire size: 11822.2 16PR, rim size: 8.25), in which: a stepped land portion is provided in the circumferential groove; the groove wall positioned on the outer side in the tire widthwise direction of the circumferential groove portion (depth: 16.7 mm, width: 5 mm, radius of curvature: 2 mm) facing the stepped land portion is provided with thirty groove fences formed along the tire circumferential direction at intervals of 250 mm therebetween such that each groove fence has a shape as shown in FIG. 2 and includes a thin wall portion having depth: 2 mm, the maximum protruding width T: 3 mm and the length H in the tire radial direction: 13 mm; and the tire is inflated at an air pressure of 800 kPa.

There were prepared six sample types in which the angle formed by a notched face of the thin wall portion with respect to the groove wall provided with the groove fence is 30°, 50°, 60°, 70°, 80° and 90°, respectively.

EXAMPLE 3

In Example 3, respective sample tires were prepared in a manner similar to that of Example 2, except that the groove fences are provided at a side wall of the stepped land portion (not the circumferential groove) positioned on the outer side in the tire widthwise direction.

COMPARATIVE EXAMPLE 1

In Comparative Example 1, there was used as a sample a tire which had been prepared in a manner similar to that of Example 1, except that the circumferential groove facing the stepped land portion lacked the groove fence.

COMPARATIVE EXAMPLE 2

In Comparative Example 2, there was used as a sample a tire which had been prepared in a manner similar to that of Example 1, except that the circumferential groove facing the stepped land portion was provided with groove fences having a shape as shown in FIG. 3 and dimensions of thickness: 2 mm, the maximum protruding width T: 2.5 mm and the length H in the tire radial direction: 15 mm.

(Evaluation 1)

For each of the tires of Example 1, Comparative Examples 1 and 2, an indoor noise test and a test by using an indoor tire tester were carried out in a state where the tire was rotated at a test speed of 35 km/h, 65 km/h and 80 km/h, respectively, with load of 3000 kg exerted thereon. The relative values or ratios (%) when the loudness of noise which occurred in Comparative Example 1 was regarded as 100% are shown in Table 1. Further, presence/absence of cracks generated at the groove bottom of the circumferential groove provided with groove fences, observed after running 10,000 km on the indoor tire tester, is shown in Table 1.

TABLE 1

| | | Test speed 35 km/h | | Test speed 60 km/h | | Test speed 80 km/h | |
|---|---|---|---|---|---|---|---|
| | Groove fence | Noise (dB %) | Crack generation | Noise (dB %) | Crack generation | Noise (dB %) | Crack generation |
| Example 1 | Groove fence having thin wall portion | 99 | No | 97 | No | 98 | No |
| Comparative Example 1 | None | 100 | No | 100 | No | 100 | No |
| Comparative Example 2 | Groove fence of conventional shape | 99 | No | 97 | Yes | 98 | Yes |

(Evaluation 2)

For each of the sample tires of Example 2 and Example 3, presence/absence of breakage of the groove fence was visually analyzed after the vulcanization molding process in the tire production and the number of the broken groove fence(s) was counted. The counting result for each of the sample tires is shown in Table 2.

TABLE 2

| | | Sample 1 | Sample 2 | Sample 3 | Sample 4 | Sample 5 | Sample 6 |
|---|---|---|---|---|---|---|---|
| Example 2 | Angle | 30° | 50° | 60° | 70° | 80° | 90° |
| | Number of broken groove fences | None | None | None | 1 | 4 | 4 |
| Example 3 | Angle | 30° | 50° | 60° | 70° | 80° | 90° |
| | Number of broken groove fences | None | None | None | None | 2 | 3 |

From the results of Table 1, it is confirmed that the tires of Example 1 and Comparative Example 2, which are provided with groove fences, can decrease noise by 1 to 3%, as compared with the tire of Comparative Example 1 in which no groove fence is provided in the circumferential groove facing the stepped land portion. Further, it is confirmed that the tire of Example 1, where the shape of the groove fence is optimized, and the tire of Comparative Example 1 having no groove fences provided therein exhibit no generation of cracks at the groove bottom, while the tire of Comparative Example 2, in which the shape of the groove fence is not optimized, exhibits cracks at the groove bottom in a case where the test speed is 60 km/h or larger.

Further, from the results of Table 2, it is confirmed that the breakage of the groove fence occurring in vulcanization molding can be significantly suppressed by setting an angle formed by a notched face of the thin wall portion with respect to the at least one of the wall surfaces provided with the groove fence at 70° or smaller. Yet further, since Example 3 exhibits better results than Example 2, it is confirmed that provision of groove fences on the side of the stepped land portion reduces breakage of groove fences better than provision of groove fences on the side of the circumferential groove.

According to the present invention, it is possible to provide a tire and a method of producing the tire, in which tire breakage of a groove fence in vulcanization molding can be suppressed, cracks are less likely to happen at a groove bottom, noise is relatively low, and uneven wear is less likely to occur.

| Explanation of Reference Numerals | |
|---|---|
| 1 | Tread portion |
| 21-24 | Circumferential groove |
| 221, 222, 241, 242 | Circumferential groove facing stepped land portion |
| 31-36 | Land portion |
| 41 | Stepped land portion |
| 42 | Surface of stepped land portion |
| 51, 52 | Groove fence |
| 53 | Thin wall portion |
| 54 | Lower portion of groove fence |
| 61 | Groove bottom |
| 62 | Innermost position in radial direction |
| 71 | Groove wall |
| 53X, 62X | Tangent |
| R | Radius of curvature |
| W | Groove width |
| T | Maximum protruding width |
| H | Length in tire radial direction |

The invention claimed is:

1. A tire in which a circumferential groove extending in the tire circumferential direction is provided in a tread portion, the tread portion is demarcated into plural land portions by the circumferential groove, and a groove bottom portion within the circumferential groove, distanced from respective groove walls of the circumferential groove, is provided with a stepped land portion as an uneven wear sacrifice portion having a surface positioned on the inner side in the tire radial direction than tread surfaces of the land portions and designed to have slip contact with a road surface when the tire is rotated under a load exerted thereon, comprising:
a groove fence provided on at least one of a groove wall surface of the circumferential groove and a side wall surface of the stepped land portion, in the extending direction of the circumferential groove at a predetermined intervals therebetween, such that the groove fence protrudes in the groove widthwise direction of the circumferential groove,
wherein the groove fence has a thin wall portion having a shape in which a portion thereof on the side of the groove bottom of the circumferential groove has been notched in a section orthogonal to the circumferential groove, and an angle formed by a notched face of the thin wall portion with respect to the at least one of the wall surfaces provided with the groove fence is set at 70° or smaller.

2. The tire of claim 1, wherein the groove fence is designed such that the innermost position in the tire radial direction of the thin wall portion thereof provided on at least one of the wall surfaces is located on the outer side in the tire radial direction than the groove bottom portion of the circumferential groove.

3. The tire of claim 1, wherein the thin wall portion of the groove fence is connected with the groove bottom portion of the circumferential groove with radius of curvature having continuity between the thin wall portion and the groove bottom.

4. The tire of claim 1, wherein the maximum protruding width of the groove fence is in the range of 20 to 80% of the width between the stepped land portion and the groove wall of the circumferential groove in a state where the groove fence is not provided.

5. The tire of claim 1, wherein the groove fences are provided such that at least one groove fence exists within a ground contact region of the tire under a condition in which the prescribed maximum air pressure and the prescribed maximum load capacity are applied to the tire.

6. The tire of claim 1, wherein the groove fence is provided only at the groove wall, located on the outer side in the tire widthwise direction, of the circumferential groove.

7. The tire of claim 1, wherein the circumferential groove is a zigzag groove extending in a zigzag manner along the tire circumferential direction.

8. A method of producing a tire, in which tire a circumferential groove extending in the tire circumferential direction is provided in a tread portion, the tread portion is demarcated into plural land portions by the circumferential groove, and a groove bottom portion within the circumferential groove, distanced from respective groove walls of the circumferential groove, is provided with a stepped land portion as an uneven wear sacrifice portion having a surface positioned on the inner side in the tire radial direction than tread surfaces of the land portions and designed to have slip contact with a road surface when the tire is rotated under a load exerted thereon, comprising:
conducting vulcanization molding such that: a groove fence is provided on at least one of a groove wall surface of the circumferential groove and a side wall surface of the stepped land portion, in the extending direction of the circumferential groove at a predetermined intervals therebetween, such that the groove fence protrudes in the groove widthwise direction of the circumferential groove,
wherein the groove fence has a thin wall portion having a shape in which a portion thereof on the side of the groove bottom of the circumferential groove has been notched in a section orthogonal to the circumferential groove, and an angle formed by a notched face of the thin wall portion with respect to the at least one of the wall surfaces provided with the groove fence is set at 70° or smaller.

* * * * *